United States Patent [19]

Kusaka et al.

[11] Patent Number: 4,644,148

[45] Date of Patent: Feb. 17, 1987

[54] FOCUS DETECTING APPARATUS

[75] Inventors: Yosuke Kusaka, Kawasaki; Jun Shimomura, Chofu, both of Japan

[73] Assignee: Nippon Kogaku K. K., Tokyo, Japan

[21] Appl. No.: 858,538

[22] Filed: Apr. 29, 1986

Related U.S. Application Data

[63] Continuation of Ser. No. 440,327, Nov. 9, 1982, abandoned.

[30] Foreign Application Priority Data

Nov. 19, 1981 [JP] Japan ................... 56-185724

[51] Int. Cl.$^4$ ............................................. G01J 1/20
[52] U.S. Cl. ..................... 250/201; 354/406
[58] Field of Search ............ 250/201, 204, 208, 209; 354/406, 407, 408

[56] References Cited

U.S. PATENT DOCUMENTS

| | | | |
|---|---|---|---|
| 3,563,634 | 2/1971 | Parks et al. | 350/162 |
| 4,185,191 | 1/1980 | Stauffer | 250/204 |
| 4,297,571 | 9/1981 | Utagawa et al. | 250/201 |
| 4,373,791 | 2/1983 | Araki | 354/25 |
| 4,417,139 | 11/1983 | Kusaka | 250/204 |

*Primary Examiner*—David C. Nelms
*Attorney, Agent, or Firm*—Shapiro and Shapiro

[57] ABSTRACT

A focus detecting apparatus has, an imaging optical system for forming an image of an object on a predetermined plane, an array having a plurality of photoelectric conversion elements arranged at predetermined interval, a focus detecting optical system for directing to the photoelectric conversion element array the light beam from the object passed through the imaging optical system, and discrimination apparatus for discriminating the imaged condition of the image of the object on the predetermined plane on the basis of the signal output of the image of the object spatially sampled at a predetermined sampling interval by the focus detecting optical system and the photoelectric conversion element array. The focus detecting optical system and the photoelectric conversion element array are disposed a predetermined distance in the direction of the optical axis from the predetermined plane so that the imaged condition of the image of the object on the predetermined plane is different from the imaged condition of the image of the object spatially sampled by the photoelectric conversion element array.

3 Claims, 23 Drawing Figures

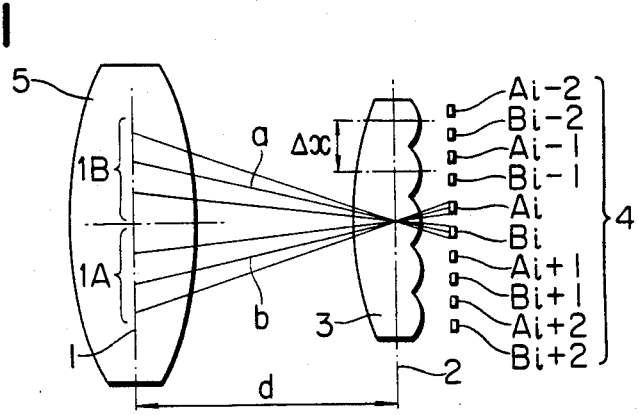
FIG. 1
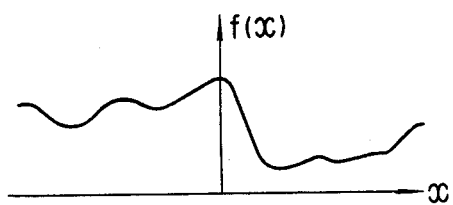
FIG. 2
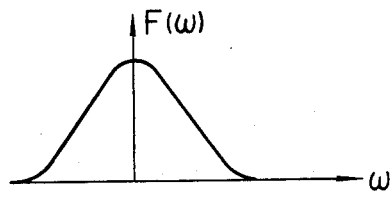
FIG. 3
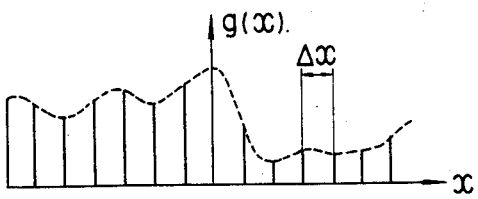
FIG. 4
FIG. 5A
FIG. 5B
FIG. 5C
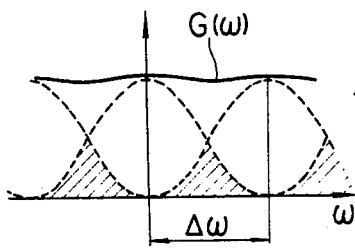
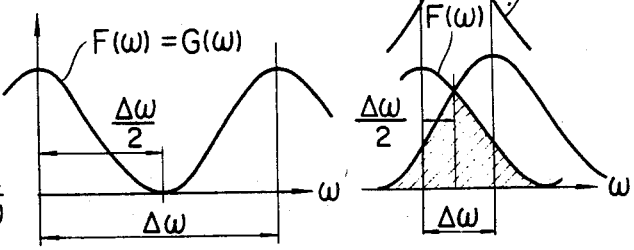

FOCUS DETECTING APPARATUS

This is a continuation application of Ser. No. 440,327 filed Nov. 9, 1982, now abandoned.

BACKGROUND OF THE INVENTION

1. Field of the Invention

This invention relates to a focus detecting apparatus in a camera or the like.

2. Description of the Prior Art

A focus detecting apparatus is known in which, as disclosed, for example, in U.S. Pat. No. 4,185,191, two object images formed by two light beams passing through two different optical paths are received by a plurality of light-receiving element arrays and converted into electrical object image signals and the distance to the object or the in-focus state of the picture-taking lens is detected from the amount of relative deflection of said two object image signals.

However, the conventional focus detecting apparatus of this type has suffered from the disadvantage that focus detection becomes impossible or wrong focus detection is effected in case the object image contains many high spatial frequency components.

SUMMARY OF THE INVENTION

The present invention intends to provide a focus detecting apparatus which is capable of accomplishing focus detection at high accuracy even if the object image contains many high spatial frequency components.

The invention will become fully apparent from the following detailed description thereof taken in conjunction with the accompanying drawings.

BRIEF DESCRIPTION OF THE DRAWINGS

FIG. 1 schematically shows the construction of the focus detecting optical system according to the prior art.

FIGS. 2, 3, 4, 5A, 5B and 5C illustrate the spatial sampling of the object image in the focus detecting apparatus of FIG. 1 by the spatial frequency area.

DESCRIPTION OF THE PREFERRED EMBODIMENTS

Figure 6:
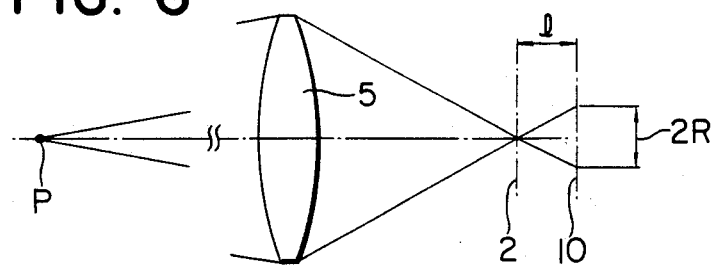
FIG. 6 illustrates the principle of the present invention.

FIG. 1 shows an example of the conventional apparatus of this type in a single lens reflex camera disclosed in U.S. Pat. No. 4,185,191.

This apparatus is such that lights of two areas 1A and 1B in an exit pupil plane 1 of a picture-taking lens (objective lens) 5 which are symmetric with respect to the optical axis are caused to enter a pair of self-scanning type photoelectric element arrays 4 such as CCD type image sensors or MOS type image sensors through a lenslet array 3 disposed in a plane 2 equivalent to a film surface and the in-focus state is detected from the phase difference between the output signals from these photoelectric element arrays. The light from the area 1A of the exit pupil enters the photoelectric element array group A ($A_0 \ldots A_i \ldots A_n$) and the light from the area 1B of the exit pupil enters the photoelectric element array group B ($B_0 \ldots B_i \ldots B_n$) and therefore, the output signal of each photoelectric element array group is a signal representing the object image formed by the light coming from the area of the exit pupil corresponding thereto. The adjacent photoelectric elements of each of the groups A and B are arranged at an interval $\Delta x$. When in the infocus state as shown in FIG. 1, the two object images formed at a position 2 equivalent to the film surface through the two areas of the exit pupil coincide with each other on a plane perpendicular to the optical axis. Accordingly, the output signal of the photoelectric element array group A and the output signal of the photoelectric element array group B also coincide with each other without any deviation therebetween.

Next, when in the rear focus state, the two object images formed through the two areas of the exit pupil coincide with each other at a position deviated from the plane 2 toward the photoelectric element arrays 4 in the direction of the optical axis, and create a deviation on the plane 2.

Accordingly, a phase difference is created between the output signal of the photoelectric element array group A and the output signal of the photoelectric element array group B.

When in the front focus state, the two object images formed through the two areas of the exit pupil coincide with each other at a position deviated from the plane 2 toward the object in the direction of the optical axis, and create a deviation in the direction opposite to the case of the rear focus state on the plane 2.

Accordingly, a phase difference opposite to the case of the rear focus state is created between the output signals of the photoelectric element array groups A and B.

Assuming that f(x) of FIG. 2 is the spatial distribution of the object images on the plane 2 of FIG. 1 and $F(\omega)$ of FIG. 3 is the spatial frequency distribution of the object image corresponding to Fourier-transformed f(x), the discrete spatial distribution g(x) of the object image spatially sampled by the light-receiving element array at an interval of $\Delta x$ becomes an aggregate of the bars of FIG. 4. The spatial frequency distribution $G(\omega)$ thereof is the result of having sampled the original object image f(x) at an interval of $\Delta x$ and is therefore equal to a sum of spatial frequency distributions $F(\omega)$ added together while being shifted by an interval $\Delta\omega = 1/\Delta x$ direction of $\omega$ axis.

This is the solid-line curve of FIG. 5A which is an input considerably different from the curve of $F(\omega)$ of FIG. 3 and therefore, it will be seen that it may generate wrong information about the object. The hatched portion in FIG. 5A shows the overlap portion of curves representing $F(\omega)$'s depicted adjacent to each other by said $\Delta\omega$, that is, shifted by the interval $\Delta\omega$ in the direction of $\omega$ axis.

The spatial frequency distribution $F(\omega)$ of the object image f(x) is bilaterally symmetric with respect to the origin and therefore, if the spatial frequency distribution $F(\omega)$ of the object image does not contain a spatial frequency component higher than the spatial frequency of $\Delta\omega/2$ which is one half of said interval $\Delta\omega$, no overlapped portion will be created as shown in FIG. 5B, so that within a range in which the spatial frequency is $|\omega| \leq \Delta\omega/2$, the spatial frequency distribution $F(\omega)$ of the original object image and the spatial frequency distribution $G(\omega)$ of the sampled object image coincide with each other and do not adversely affect focus detection.

However, where the spatial frequency distribution $F(\omega)$ of the original object image contains much of the spatial frequency component higher than said spatial frequency of $\Delta\omega/2$, the overlapped portion becomes large as shown in FIG. 5C and as a result, the spatial frequency distribution $G(\omega)$ of the sampled object image becomes different from the spatial frequency distribution $F(\omega)$ of the original object image and adversely affects focus detection, thus reducing the accuracy of focus detection.

Description will now be made of the principle for eliminating high spatial frequency components and obtaining the spatial frequency distribution as shown in FIG. 5B. FIG. 6 shows a condition in which the picture-taking lens 5 forms the object image on the plane 2 equivalent to the film surface, namely, the in-focus state.

Figure 7:
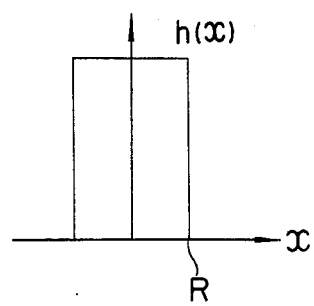
FIGS. 7, 8, 9, 10, 11, 12 and 13 illustrate the spatial sampling of the object image in the focus detecting apparatus according to the present invention by the spatial frequency area.

In this state, when the imaged condition on a plane 10 distant by a distance l from the plane 2 equivalent to the film surface in the direction of the optical axis is considered, and assuming that the object is a point P, the object image on the plane 10 becomes an image blurred in the form of a disc approximately having a radius R. The spatial distribution $h(x)$ of the object image on this plane 10, is as approximately shown in FIG. 7.

Figure 8:
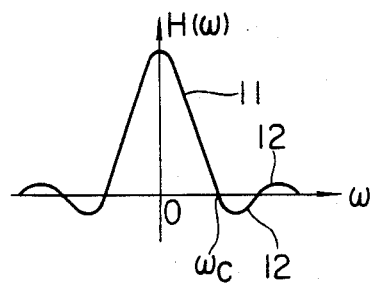

The spatial frequency transfer function (hereinafter referred to as OTF) corresponding to the Fourier transformation of $h(x)$ in a case where such blur is created on the plane 10, has a main peak 11 in the zero frequency and is attenuated in vibration toward high frequencies, as shown in FIG. 8. This will hereinafter designated $H(\omega)$.

If the radius of the disc-like blurred image relative to the point image is R, the frequency $\omega_c$ in which $H(\omega)$ becomes zero is roughly given by the following equation:

$$\omega_c = 3.83/(2\pi \times R) \quad (1)$$

If the spatial distribution on the plane 10 of the object image which is not a point image is $d(x)$, the relation among $d(x)$, $f(x)$ and $h(x)$ is represented by the following equation in convolution integral.

$$d(x) = \int_{-\infty}^{\infty} f(x') \cdot h(x - x')dx' \quad (2)$$

Figure 9:
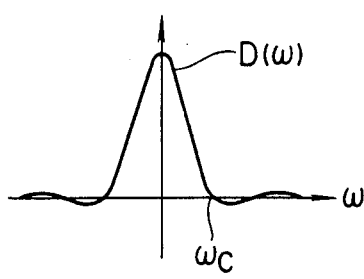

Assuming that the spatial frequency distribution of the object image when there is no blur is $F(\omega)$ as shown in FIG. 3, that the OTF when blur on the plane 10 has been created is $H(\omega)$ as shown in FIG. 8 and that the spatial frequency distribution of the object image when there is blur on the plane 10 which is the Fourier transformation of $d(x)$ is $D(\omega)$, this is expressed as the following equation (3) from equation (2) and this $D(\omega)$ takes the form shown in FIG. 9.

$$D(\omega) = F(\omega) \times H(\omega) \quad (3)$$

That is, even if the spatial frequency distribution $F(\omega)$ of the object image contains many high spatial frequency components as shown in FIG. 3, it is multiplied by the $H(\omega)$ shown in FIG. 8 and as a result, it is seen Z5 that the high frequency components higher than the frequency $\omega_c$ is substantially cut by the multiplication of equation (3) and the spatial frequency distribution $D(\omega)$ of the object image thus synthesized takes a form which substantially does not contain high frequency components higher than $\omega_c$, as shown in FIG. 9. When the object image in blurred state is spatially sampled at the interval of $\Delta x$ by the photoelectric conversion element arrays and converted into a discrete object image signal, as indicated by the line in FIG. 10, the sampled discrete spatial frequency distribution $B(\omega)$ of this object image becomes equal to the spatial frequency distributions $D(\omega)$ of the blurred object image shown by broken line in FIG. 10 being added together while being shifted at each interval of $\Delta\omega = 1/\Delta x$ as shown.

Figure 10:
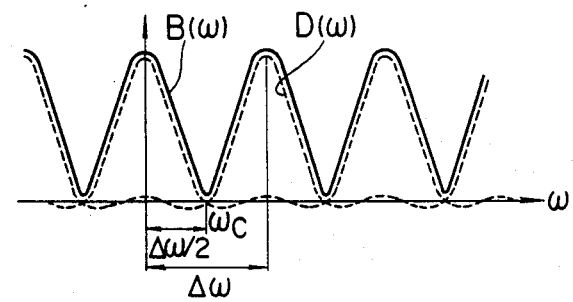

In FIG. 10, the frequency $\omega_c$ due to the blur is made equal to $\frac{1}{2}$ of the interval $\Delta\omega$, i.e., $\Delta\omega/2$, and therefore, even if the spatial frequency distributions $D(\omega)$ are added together while being shifted at each interval $\Delta\omega$, there occurs no overlap of the spatial frequency distributions $F(\omega)$ as indicated by hatching in FIG. 5A.

Accordingly, in the area wherein the spatial frequency is $|\omega| \leq \Delta\omega/2$, the spatial frequency distribution $D(\omega)$ of the object image when there is blur and the spatial frequency distribution $B(\omega)$ of the object image sampled at the interval of $\Delta x$ coincide with each other, and do not adversely affect focus detection. Generally, R is determined by suitably selecting l as seen from the equation (1) and therefore, the frequency $\omega_c$ due to the blur shown in FIGS. 8 and 9 can be made into a suitable value and, if the frequency $\omega_c$ is suitably selected, it is possible to reduce or eliminate the portion in which spatial frequency distributions overlap each other corresponding to the portion indicated by hatching in FIG. 5A.

Actually, if the frequency $\omega_c$ is selected so as to be substantially $$\omega_c = \Delta\omega/2 = 1/(2\Delta x) \quad (4)$$

as shown in FIG. 10, it will be seen that the influence of the overlap can be eliminated and the low frequency side is hardly affected.

Figure 11:
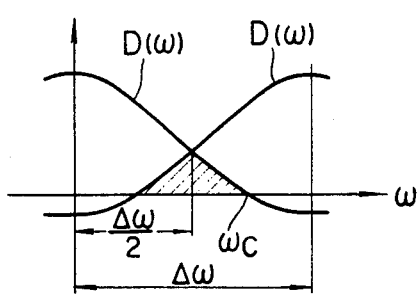

Now, where $\Delta\omega$ is an interval determined by the sampling interval $\Delta x$ and the frequency $\omega_c$ is selected to $\Delta\omega/2 < \omega_c < \Delta\omega$ as shown in FIG. 11, it is seen that the spatial frequency distributions $D(\omega)$ arranged on the axis while being shifted at the interval $\Delta\omega$ still overlap each other as indicated by hatching.

Figure 12:
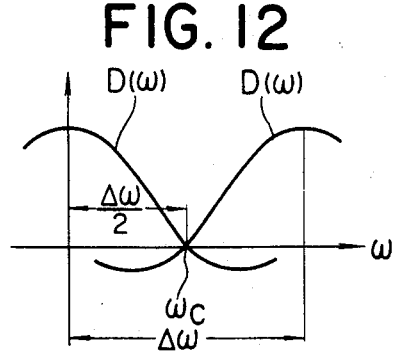

FIG. 12 shows that the overlap as described above disappears in case the frequency $\omega_c$ is $\omega_c \approx \Delta\omega/2$.

Figure 13:
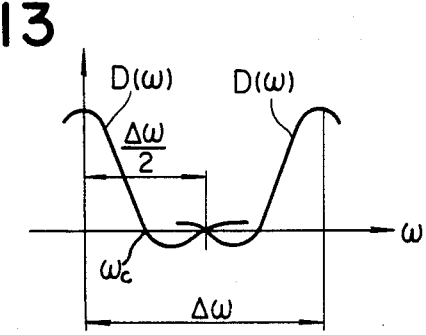

Further, in FIG. 13, it is seen that in case the frequency $\omega_c$ is $0 < \omega_c < \Delta\omega/2$, the overlap as described above is substantially eliminated, but as compared with the case of FIG. 12, the spatial frequency distribution $D(\omega)$ on the low frequency side is decreased and an undesirable influence is imparted to the low frequency side.

Description will now be made of an embodiment of the focus detecting apparatus of the present invention to which the above-described principle is applied.

Figure 14:
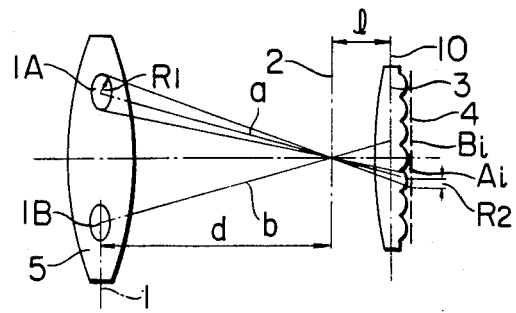
FIGS. 14, 15, 16, 17, 18 and 19 illustrate the focus detection condition of an embodiment of the present invention.
Figure 16:
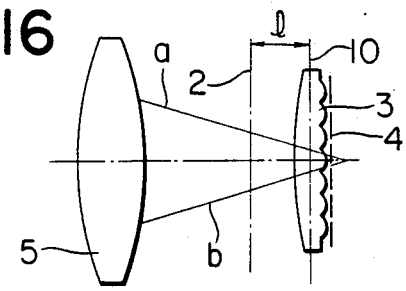
Figure 18:
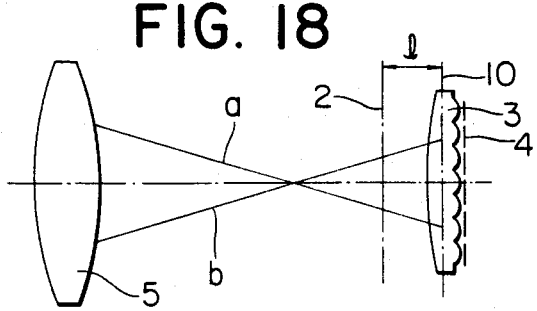

FIGS. 14, 16 and 18 show an embodiment of the present invention in which the lenslet array 3 described in connection with FIG. 1 is disposed in a plane 10 spaced by a distance l in the direction of the optical axis from the plane 2 which is equivalent to the film surface.

Figure 15:
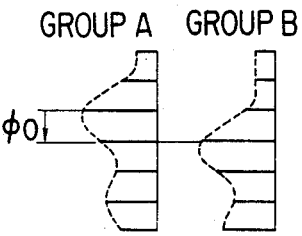

When the picture-taking lens is in the in-focus state relative to the plane 2 equivalent to the film surface, two object images formed on the lenslet array position 10 through two areas of the exit pupil as shown in FIG. 14 are blurred and at the same time create a deviation therebetween. Accordingly, as shown in FIG. 15, there is created a phase difference between the output signal of the photoelectric element array group A and the output signal of the photoelectric element array group B. In FIG. 14, the lenslet array position 10 is rearward of the position 2 equivalent to the film surface and therefore, if the sign of the phase difference is determined with the output signal of the photoelectric element array group A as the reference, the sign of the then phase difference $\phi_0$ is minus.

Figure 17:
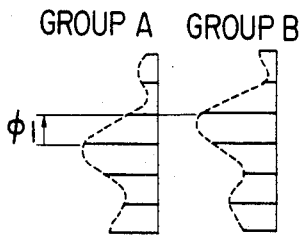

When the picture-taking lens is in the rear focus state as shown in FIG. 16, said two object images are blurred and at the same time create a deviation between the positions thereof. Accordingly, as shown in FIG. 17, there is created a phase difference $\phi_1$, for example, between the output signal of the photoelectric element array group A and the output signal of the photoelectric element array group B. Actually, however, the sign of the phase difference is varied by the phase difference $\phi_0$ and the amount of rear focus.

Figure 19:
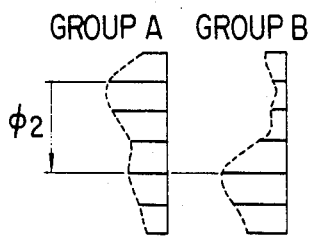

When the picture-taking lens is in the front focus state as shown in FIG. 18, said two object images are blurred and at the same time, between the positions thereof, there is created a greater deviation from the deviated positions of the two object images in the infocus state in the direction opposite to the direction of deviation in the rear focus state. Accordingly, as shown in FIG. 19, a greater phase difference $\phi_2$ of the same sign as the phase difference in the in-focus state is created between the output signal of the photoelectric element array group A and the output signal of the photoelectric element array group B.

Accordingly, if the initial phase difference $\phi_0$ in the in-focus state is prestored and the initial phase difference $\phi_0$ is subtracted from the phase difference $\phi$ detected in each focus state to find a new phase difference $\phi' = \phi - \phi_0$, the focus states such as the front focus, the rear focus and the in-focus can be discriminated by examining the sign of the new phase difference $\phi'$ by the use of a method similar to the focus detection principle in the conventional focus detecting apparatus described in connection with FIGS. 1 to 5C. If the absolute amount of deviation from the in-focus state can be known with the aid of the absolute amount of $\phi'$, a proper focus position can be known from the amount of deviation between the two object images.

In FIG. 14, it is desirable that the distance l by which the lenslet array 3 is shifted in the direction of the optical axis from the plane 2 equivalent to the film surface be determined as follows.

Let it be assumed that the distance between the exit pupil plane 1 of the picture-taking lens and the film surface or the plane 2 equivalent thereto is d and that the elements Ai and Bi of the light-receiving element array groups A and B receive the light beams passing through the areas of radius $R_1$ centered at the points 1A and 1B on the exit pupil plane 1. At this time, in the state in which the object which is a point image is properly imaged on the plane 2 equivalent to the film surface, namely, in the in-focus state, the point image detects an image blurred in the form of a disc of radius $R_2(R_2=R)$ on each light-receiving element array group A, B in the plane distant by a distance l in the direction of the optical axis from the plane 2 equivalent to the film surface. Here, $R_1$ is the radius when the image of the light-receiving surface of one photoelectric element in the photoelectric element array 4 formed on the exit pupil plane through the lenslet array 2 in FIG. 1.

The radius $R_2$ is given by the following equation:

$$R_2 \times R_1 / d \qquad (5)$$

Accordingly, from equations (1) and (4), if the sampling interval $\Delta x$ is substantially the pitch interval of the lenslet as viewed from the structure in FIG. 14, the influence of the overlap of the spatial frequency distributions of the object image by sampling can be alleviated by determining the deflection distance l in the direction of the optical axis from the plane 2 to $$l = \frac{3.83 \times \Delta x \times d}{\pi \times R_1}. \qquad (6)$$

Another embodiment of the present invention will hereinafter be described by reference to FIGS. 20 and 21. The focus detecting method shown in FIGS. 20 and 21 more or less differs from the previously described embodiment. A field lens 6 is provided on the fixed focal plane of an objective lens 5 or on a plane 2 equivalent thereto. Photoelectric element arrays 4A and 4B are provided at positions conjugate with the field lens 6, namely, with the fixed focal plane of the lens 5 or the plane 2 equivalent thereto, with respect to imaging lenses 7 and 8. In such a focus detecting system, focus detection is effected in the following manner. The phases of the outputs of the photoelectric element arrays 4A and 4B coincide with each other when the object image by the objective lens 5 is formed on the fixed focal plane 2, that is, when the objective lens is in the in-focus state. Next, the phases of the outputs of the photoelectric element arrays 4A and 4B create a deflection when the object image by the objective lens 5 is formed forwardly or rearwardly of the fixed focal plane 2, that is, when the objective lens is in the front focus or the rear focus state.

The photoelectric element arrays 4A and 4B use for focus detection the light beams passing through areas 1A and 1B upon which the shapes of the imaging lenses 7 and 8 are projected by the field lens 6. The field lens 6 is usually designed such that these areas are on or near the exit pupil plane of the objective lens 5.

Figure 21:
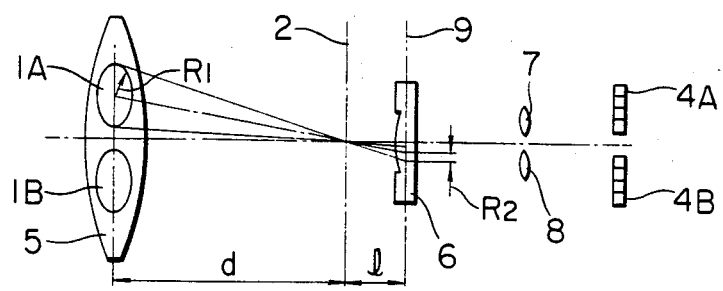

FIG. 21 shows another embodiment in which the present invention is applied to the above-described focus detecting apparatus.

Figure 20:
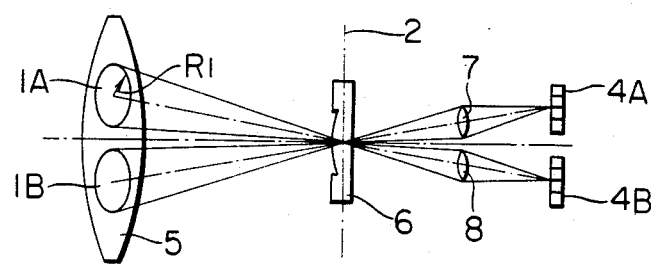
FIGS. 20 and 21 show another embodiment of the present invention.

The apparatus of FIG. 21 is in a condition in which the focus detecting optical system comprising the field lens 6, the imaging lenses 7, 8 and the photoelectric element arrays 4A, 4B shown in FIG. 20 has been parallel-moved from the condition of FIG. 20 by a distance l rearwardly from said fixed focal plane 2. If the areas 1A and 1B on said exit pupil plane are approximated by a circle of radius $R_1$ and the distance between the exit pupil plane and the fixed focal plane 2 is d, the radius of the blur relative to the point image formed on a plane 9 distance by l from the fixed focal plane 2 by the light beam passing through the areas 1A and 1B on said exit pupil plane during the in-focus state is $$R_2 = R_1 \times l/d \qquad (5)$$

as in the previously described embodiment.

As compared with the conventional focus detecting apparatus, the focus detecting apparatus of the present invention described in connection with FIG. 14 or 21 is excellent in the following points. In the conventional focus detecting apparatus, the sampling by the photoelectric conversion element is effected on two relatively sharp object images in the vicinity of the infocus state, whereby the relative deflection of two object image signals is detected and therefore, where the object image contains much high spatial frequency components, there occurs the disadvantage that as previously described, a false in-focus point is detected in the vicinity of the in-focus point or the accuracy of focus detection is aggravated under the influence of the overlap of the spatial frequency distributions. In contrast, in the focus detecting apparatus according to the present invention, even where the object image contains many high spatial frequency components, the high frequency components are effectively cut, whereby the influence of the overlap of the spatial frequency distributions is eliminated and focus detection can be accomplished with high stability and accuracy in the vicinity of the in-focus point.

Moreover, for this purpose, the focus detecting apparatus of the present invention does not require any costly procedure such as preparing a part such as a special high spatial frequency filter and placing it into the optical path. Furthermore, if said distance l is suitably selected, the present invention can be expected to meet the desire of installing the photoelectric conversion element array for focus detection without eclipsing the picture-taking light beam into the sufficiently deep location in the bottom of the mirror box of a camera.

We claim:

1. In a focus detecting apparatus for detecting an image position of an object through an imaging optical system that forms an image of light from the object on a predetermined plane, said apparatus including detection means for detecting intensity of light from the object through said imaging optical system, said detection means having a plurality of photoelectric conversion elements arranged in a single dimensional direction, the improvement comprising:

a focus detection optical system leading a part of the light from the object through said imaging optical system to said plurality of photoelectric conversion elements and having a detection plane arranged between said imaging optical system and said detection means, said detection means detecting distribution of the intensity of light on said detection plane at predetermined intervals, said focus detection optical system including a lenslet array component, said detection plane being at least a predetermined distance away from said predetermined plane in an optical axial direction of said imaging optical system, said predetermined distance being substantially defined by the following expression:

$$\frac{3.83 \cdot \Delta X \cdot d}{\pi \cdot R}$$

where R is a radius of the circular area approximated to the area covered by the imate of one of said plurality of photoelectric conversion elements projected on the exit pupil of said imaging optical system by said lenslet array component, d is a distance between the plane of said exit pupil and said predetermined plane, and $\Delta X$ is said predetermined interval.

2. In a focus detecting apparatus for detecting an image position of an object through an imaging optical system that forms an image of light from the object on a predetermined plane, said apparatus including detection means for detecting intensity of light from the object through said imaging optical system, said detection means having a plurality of photoelectric conversion elements arranged in a single dimensional direction, the improvement comprising:

a focus detection optical system leading part of the light from the object through said imaging optical system to said plurality of photoelectric conversion elements and having a detection plane arranged between said imaging optical system and said detection means, said detection means detecting distribution of the intensity of light on said detection plane at predetermined intervals, said focus detection optical system including a field lens component and at least one imaging optical system arranged between said field lens component and said plurality of photoelectric conversion elements, said detection plane being at least a predetermined distance away from said predetermined plane in an optical axial direction of said imaging optical system, said predetermined distance being substantially defined by the following expression:

$$\frac{3.83 \cdot \Delta X \cdot d}{\pi \cdot R}$$

where R is a radius of the circular area approximated to the area covered by the image of the shape of said at least one imaging optical system projected on the exit pupil of said imaging optical system by said field lens component, d is a distance between the plane of said exit pupil and said predetermined plane, and $\Delta X$ is said predetermined interval.

3. In a focus detecting apparatus for detecting an image position of an object through an imaging optical system that forms an image of light from the object on a predetermined plane, said apparatus including detection means for detecting intensity of light from the object through said imaging optical system, said detection means having a plurality of photoelectric conversion elements arranged in a single dimensional direction, the improvement comprising:

a focus detection optical system leading part of the light from the object through said imaging optical system to said plurality of photoelectric conversion elements and having a detection plane arranged between said imaging optical system and said detection means, said detection means detecting distribution of the intensity of light on said detection plane at predetermined intervals.

said detection plane being at least a predetermined distance away from said predetermined plane in an optical axial direction of said imaging optical system so that in the intensity distribution of light at said detection plane the amount of the spatial frequency components which are higher than a spatial frequency component corresponding to the inverse of twice the length of said predetermined interval is substantially reduced, when the image of the light from the object through said imaging optical system is formed on said predetermined plane.

* * * * *